(12) United States Patent
Scacchi et al.

(10) Patent No.: US 9,718,537 B2
(45) Date of Patent: Aug. 1, 2017

(54) SYSTEM AND METHOD FOR PILOTING AN AIRCRAFT

(71) Applicant: Airbus Operations (SAS), Toulouse (FR)

(72) Inventors: Pierre Scacchi, Toulouse (FR); Matthieu Mayolle, Tournefeuille (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 15/012,192

(22) Filed: Feb. 1, 2016

(65) Prior Publication Data
US 2016/0229523 A1    Aug. 11, 2016

(30) Foreign Application Priority Data

Feb. 9, 2015    (FR) ..................................... 15 50995

(51) Int. Cl.
*B64C 13/22*    (2006.01)
*B64C 13/04*    (2006.01)
*G05D 1/08*    (2006.01)

(52) U.S. Cl.
CPC .............. *B64C 13/22* (2013.01); *B64C 13/04* (2013.01); *G05D 1/0808* (2013.01)

(58) Field of Classification Search
CPC ........ B64C 13/04; B64C 13/22; G05D 1/0808
USPC ....................................................... 701/3–18
See application file for complete search history.

(56) References Cited

U.S. PATENT DOCUMENTS

| 3,011,739 | A |   | 12/1961 | Boyce et al. |
| 3,771,037 | A | * | 11/1973 | Bailey, Jr. ............... B64C 13/04 244/237 |
| 4,109,886 | A | * | 8/1978 | Tribken ............... G05D 1/0833 244/17.13 |
| 4,420,808 | A |   | 12/1983 | Diamond et al. |
| 4,584,510 | A | * | 4/1986 | Hollow ................... B64C 13/04 244/234 |
| 4,642,774 | A | * | 2/1987 | Centala ................ G05D 1/0816 244/197 |
| 5,001,646 | A | * | 3/1991 | Caldwell .............. G05D 1/0858 701/3 |
| 5,826,834 | A |   | 10/1998 | Potter et al. |

(Continued)

FOREIGN PATENT DOCUMENTS

| FR | 2842337 | 1/2004 |
| FR | 2857468 | 1/2005 |

(Continued)

OTHER PUBLICATIONS

French Search Report, Dec. 2, 2015, priority document.

*Primary Examiner* — Tyler J Lee
(74) *Attorney, Agent, or Firm* — Greer, Burns & Crain, Ltd.

(57) ABSTRACT

A piloting system having a control stick configured to control the aircraft with respect to its three piloting axes, namely the pitch axis, the roll axis and the yaw axis, and an auxiliary control device configured to automatically control the aircraft during one of the following phases: a landing phase and a takeoff phase. The auxiliary control device automatically controls the aircraft with respect to at least one of the piloting axes, and the other piloting axes, which are not controlled automatically by the auxiliary control device, then being controlled manually by a pilot with the aid of the control stick.

12 Claims, 3 Drawing Sheets

(56) References Cited

U.S. PATENT DOCUMENTS

| | | | |
|---|---|---|---|
| 6,885,917 B2 * | 4/2005 | Osder | B64C 27/18 |
| | | | 244/10 |
| 7,014,146 B2 | 3/2006 | Villaume et al. | |
| 7,139,645 B2 | 11/2006 | Villaume et al. | |
| 7,835,829 B2 | 11/2010 | Villaume et al. | |
| 7,908,043 B2 | 3/2011 | Villaume et al. | |
| 2007/0235593 A1 * | 10/2007 | Rollet | B64C 13/12 |
| | | | 244/221 |
| 2010/0076625 A1 | 3/2010 | Yoeli | |
| 2013/0293362 A1 * | 11/2013 | Parazynski | G08C 19/16 |
| | | | 340/12.52 |

FOREIGN PATENT DOCUMENTS

| | | |
|---|---|---|
| FR | 2909461 | 6/2008 |
| FR | 2909463 | 6/2008 |
| WO | 2008065664 | 6/2008 |

* cited by examiner

SYSTEM AND METHOD FOR PILOTING AN AIRCRAFT

CROSS-REFERENCES TO RELATED APPLICATIONS

This application claims the benefit of the French patent application No. 1550995 filed on Feb. 9, 2015, the entire disclosures of which are incorporated herein by way of reference.

BACKGROUND OF THE INVENTION

The present invention relates to a system and a method for piloting an aircraft, in particular a civil or military transport airplane.

It is known that the manual piloting of an aircraft by a pilot about its three piloting axes (or control axes), namely the pitch axis, the roll axis and the yaw axis, is carried out:
for the roll and pitch axes, by way of a control stick, in particular a mini-stick; and
for the yaw axis, mainly by way of two piloting members: a rudder bar and a helm.

The helm (or "tiller") which is, generally, present in the flight deck of large-size aircraft, makes it possible to steer a nose wheel when the aircraft is on the ground at reduced speed (during the rolling phase).

Moreover, the rudder bar, which the pilot actuates with his feet, makes it possible to steer the rudder of the aircraft, in the air and on the ground. It also allows the steering of the nose wheel on the ground, especially at high speed. The rudder bar is used, in a standard manner, especially for the following maneuvers:
precise alignment of the aircraft with the axis of the runway used, during the takeoff phase;
control of the aircraft in yaw on the ground on takeoff in the presence of disturbances (for example an engine fault causing an undesired yaw motion, or else crosswind tending to push the aircraft toward one of the edges of the runway);
in flight, turning compensation;
in flight, correction of the air sideslip caused by a thrust dissymmetry, especially in the case of a fault with one of the engines;
in a crosswind landing, if the aircraft nears the runway "crab" fashion, that is to say if its heading (the direction in which the aircraft is pointing) is different from its velocity vector (aligned with the axis of the runway), just before the wheels of the aircraft touch down on the ground, an alignment maneuver (or "de-crab" maneuver) which comprises bringing the heading of the aircraft back, at least in part, toward its velocity vector, so as to put the aircraft down with a reduced ground sideslip angle;
precise alignment of the aircraft with the axis of the runway used, during the rollout phase on landing.

Furthermore, the rudder bar may be configured to comprise at one and the same time a control functionality for the rudder, such as aforementioned, and a braking functionality, the brake pedals then being integrated into this equipment.

This standard architecture for piloting the aircraft in relation to its piloting axes (or control axes), which comprises several piloting members including the rudder bar which is bulky, exhibits a relatively large bulkiness overall.

SUMMARY OF THE INVENTION

An object of the present invention is to remedy this drawback. It relates to a system for piloting an aircraft, comprising at least one control stick configured to be able to be actuated by a pilot so as to control the aircraft with respect to at least some of its piloting axes, which exhibits reduced bulkiness.

According to the invention, the piloting system is noteworthy in that the control stick is configured to be able to control the aircraft with respect to its three piloting axes, namely the pitch axis, the roll axis and the yaw axis, and in that the piloting system comprises, moreover, an auxiliary control device configured to automatically control the aircraft during one of the following phases: a landing phase and a takeoff phase, the auxiliary control device then controlling the aircraft automatically with respect to at least one of the piloting axes, and the other piloting axes which are not controlled automatically by the auxiliary control device then being able to be controlled manually with the aid of the control stick.

Thus, by virtue of the invention, a functionality for piloting the aircraft in terms of yaw is integrated into the control stick, which is thus of so-called "three axis" type. It is therefore possible to dispense with the rudder bar, thereby saving space in the flight deck, the rudder bar being a bulky item of equipment. Thus, the piloting system which makes it possible to pilot the aircraft about its three piloting axes exhibits reduced bulkiness with respect to a standard system (with a control stick of "two axis" type and a rudder bar), and it makes it possible to remedy the aforementioned drawback.

Furthermore, by virtue of the auxiliary control device which automatically controls the aircraft with respect to at least one of its piloting axes during a landing phase or a takeoff phase, that is to say during the phases that may require simultaneous control in relation to the three piloting axes, the pilot need control, whatever the phase concerned, at the maximum two axes at a time. This makes it possible to remedy a pilot's difficulty in piloting the aircraft simultaneously in relation to the three piloting axes with the aid of one and the same piloting member (the control stick of "three axis" type).

In a preferred embodiment, the auxiliary control device comprises at least one control module for automatically determining, with the aid of at least one integrated control law, a control order which is applied to control surfaces of the aircraft so as to control the aircraft with respect to at least one corresponding piloting axis.

Advantageously, the auxiliary control device comprises, as control modules:
a module for slaving the yaw rate of the aircraft, which is configured to automatically maintain the yaw rate at zero to within a margin, on the ground, during the takeoff phase;
a module for automatically maintaining the wings level, on the ground, during the takeoff phase;
a module for automatic compensation of turning, in flight; and
a module for automatic yaw alignment (or for "de-crabbing"), during the landing phase.

Furthermore, in an advantageous manner, the auxiliary control device comprises moreover:
a module for slaving the aircraft to a given axis in terms of yaw, during the takeoff phase; and
a module for automatic control of a flare, during the landing phase.

Moreover, advantageously, the auxiliary control device comprises:
an automatic takeoff set comprising for the takeoff phase:

a module for automatically slaving the aircraft to a virtual axis in terms of yaw;

the module for automatically maintaining the wings level; and an automatic rotation module; and an automatic landing set comprising for the landing phase:

the module for automatic yaw alignment;

the automatic flare control module; and a module for automatically maintaining a lateral axis in flight and on the ground in respect of roll.

Moreover, in a preferred embodiment, the control stick comprises a lever provided with a handle, and it is configured:

to be able to be pivoted as a whole in a first plane, to control the aircraft in relation to the pitch axis; and to be able to be pivoted as a whole in a second plane different from the first plane, to control the aircraft in relation to the roll axis, and the handle is configured to be able to be pivoted with respect to the lever to control the aircraft in relation to the yaw axis.

In a particular embodiment, the handle is configured to return automatically to a neutral position when it is released, after having been previously actuated to control the yaw axis.

Furthermore, advantageously, the control stick comprises a resistance element configured to generate a resistance in the handle during its actuation with a view to controlling the yaw axis.

Moreover, in an advantageous manner, the handle being able to be pivoted, the maximum angular travel of the handle to control the aircraft in relation to the yaw axis is larger in one direction than in the other, relative to a neutral position.

The present invention also relates to a method for piloting an aircraft, the aircraft comprising at least one control stick configured to be able to be actuated by a pilot so as to control the aircraft with respect to at least some of its piloting axes.

According to the invention, the piloting method comprises:

an automatic piloting step comprises controlling the aircraft automatically with respect to at least one of the piloting axes, during one of the following phases of the aircraft: a landing phase and a takeoff phase; and a manual piloting step comprising allowing a pilot to control manually, via the control stick, the other piloting axes which are not controlled automatically by the auxiliary control device during the landing and takeoff phases, the control stick being configured to be able to control the aircraft with respect to its three piloting axes, namely the pitch axis, the roll axis and the yaw axis.

Advantageously, the automatic piloting step comprises automatically controlling the aircraft with respect to the set of its piloting axes during the landing and takeoff phases.

The present invention also relates to an aircraft, in particular a transport airplane, which is provided with a piloting system such as that specified hereinabove.

BRIEF DESCRIPTION OF THE DRAWINGS

The appended figures will elucidate the manner in which the invention may be embodied. In these figures, identical references designate similar elements.

DETAILED DESCRIPTION OF THE PREFERRED EMBODIMENTS

Figure 1:
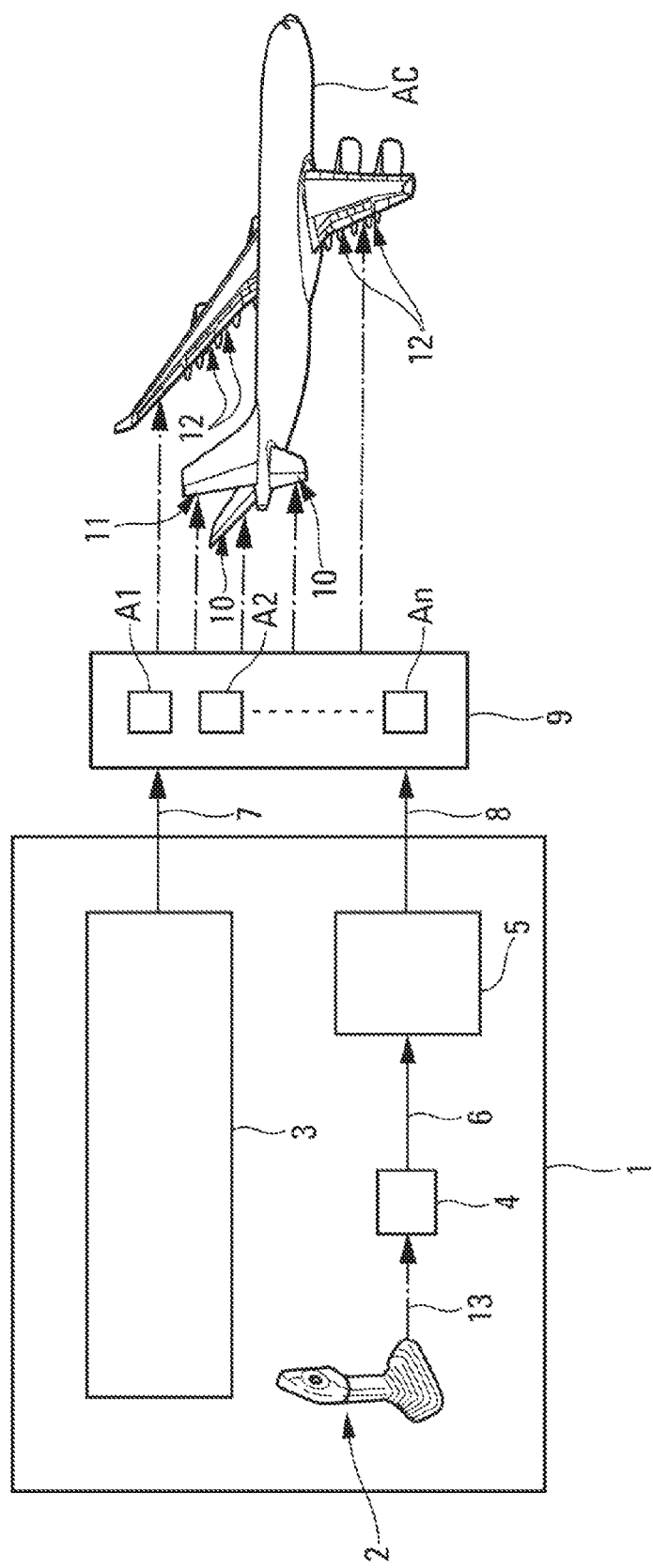
FIG. 1 is the schematic diagram of a particular embodiment of a system for piloting an aircraft, represented outside the aircraft for the sake of clarity.

The system 1 represented schematically in FIG. 1 and making it possible to illustrate the invention, is a system for piloting an aircraft AC, for example a civil or military transport airplane.

The piloting system 1 is able to make it possible to pilot the aircraft AC about its three piloting axes (or control axes), namely the pitch axis, the roll axis and the yaw axis.

In a standard manner, the piloting system 1 comprises at least one control stick 2 (of "side stick," "control column" type, etc.) which is configured to be able to be actuated by a pilot so as to control the aircraft AC with respect to at least some of its piloting axes.

Figure 2:
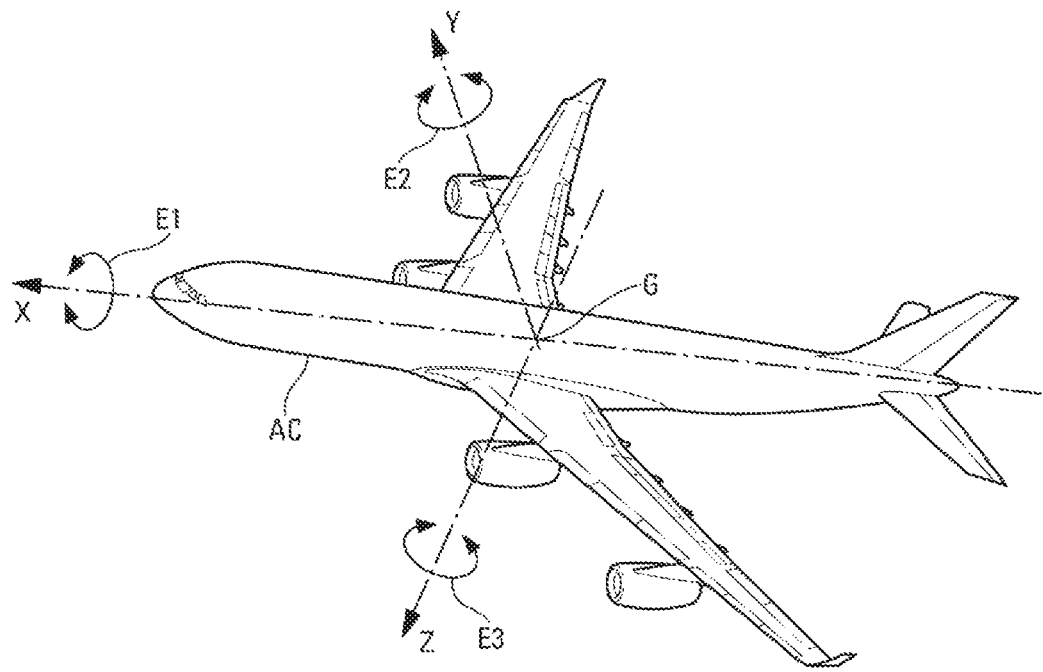
FIG. 2 shows an aircraft, namely a transport airplane, provided with such a piloting system, on which the three piloting axes have been depicted.

According to the invention, the control stick 2 is configured to be able to control the aircraft AC with respect to the set of its three piloting axes, namely the pitch axis Y, the roll axis X and the yaw axis Z, as represented in FIG. 2. In FIG. 2, the axes X, Y and Z meet at a point G, preferably the center of gravity of the aircraft AC, and the motion of the aircraft AC about the axes X, Y and Z is depicted, respectively, by double arrows E1, E2 and E3 (illustrating respectively the variations of the angles of roll, pitch and yaw).

A functionality for piloting the aircraft AC in terms of yaw is therefore integrated into the control stick 2, which is thus of so-called "three axis" type. It is thus possible to dispense with a standard rudder bar, thereby saving space in the cockpit, the rudder bar being a bulky item of equipment. The piloting system 1 which makes it possible to pilot the aircraft about its three piloting axes exhibits reduced bulkiness with respect to a standard system (with a control stick of "two axis" type and a rudder bar). It also exhibits a reduced cost.

Moreover, according to the invention, the piloting system 1 also comprises an auxiliary control device 3 configured to automatically control the aircraft AC during one of the following phases: a landing phase and a takeoff phase. The auxiliary control device 3 then automatically controls the aircraft AC with respect to at least one of the piloting axes. The other piloting axes which, if appropriate, are not controlled automatically by the auxiliary control device 3 during these phases, are then able to be controlled, if necessary, manually with the aid of the control stick 2 by a pilot of the aircraft AC.

The auxiliary control device 3 comprises a plurality of control modules for automatically determining, with the aid each time of at least one integrated control law, a control order which is applied to control surfaces of the aircraft so as to control the aircraft with respect to a corresponding piloting axis.

The piloting system 1 also comprises:

a set 4 of standard measurement means, which are able to measure, as illustrated by a chain-dotted arrow 13, the amplitude of the deflections of the control stick 2 in relation to its pivoting axes, specified hereinbelow with reference to FIG. 6; and a calculation means 5 for determining control orders representative of the deflection or deflections measured by the set 4 of measurement means and received via a link 6.

The control orders (roll, pitch, yaw orders) generated by the auxiliary control device 3 and those generated by the calculation means 5 are transmitted, respectively, by way of links 7 and 8 to a set 9 of standard actuators A1, A2, ..., An of the aircraft AC, n being an integer.

These actuators A1, A2, ..., An are able to actuate, in a standard manner, as illustrated schematically by dashed links, especially elevators 10, a fin 11 and standard roll control surfaces 12 of the aircraft.

Although the piloting system 1 is represented in FIG. 1 outside the aircraft AC for the sake of clarity and simplification, the piloting system 1 is of course mounted in the aircraft AC.

By virtue of the auxiliary control device 3 which automatically controls the aircraft AC with respect to at least one of its piloting axes during a landing phase or a takeoff phase, that is to say during the phases that may require simultaneous control in relation to the three piloting axes, the pilot need control the aircraft AC at the maximum in relation to two piloting axes at a time. This makes it possible to remedy a pilot's difficulty in piloting the aircraft simultaneously in relation to the three piloting axes with the aid of one and the same piloting member (the control stick 2).

Indeed, the main problem posed by the use of a "three-axis" control stick 2 is to do with the fact that it is difficult (but nevertheless possible) to pilot an aircraft by piloting the three axes at a time. Indeed, for physiological reasons in respect of the pilot's wrist and forearm, when the control stick 2 is pivoted simultaneously in the three directions, a motion on one of the piloting axes will cause, by coupling, parasitic motions on the other piloting axes, thus complicating the fine piloting of the aircraft on a single piloting axis.

Now, there mainly exist two dynamic flight phases in the course of which the pilot has potentially to pilot the three piloting axes simultaneously, namely:
- takeoff, in a crosswind or with an engine fault. For example, in case of engine fault, after the characteristic speed V1 (the pilot then having to continue the takeoff), the pilot must at one and the same time counter the thrust dissymmetry through a yaw order, carry out the rotation of the aircraft through a pitch order, and maintain the wings level through a roll order; and
- landing in a crosswind. Indeed, just before the wheels of the aircraft touch down on the ground, the pilot must simultaneously carry out the maintaining of the wings level through a roll order, the flare on landing through a pitch order, and the alignment of "de-crab" type through a yaw order.

During the other flight phases, the simultaneous control of the three piloting axes is not necessary. Indeed:
- during a ground rolling phase, only the yaw axis is used;
- on the runway, before the rotation on takeoff and after the wheels touch down on landing, the yaw axis is mainly used (the pilot may if necessary act on the roll axis to maintain the wings of the aircraft level while rolling);
- in flight, by virtue of the compensation ("trim") on the rudder, solely the roll and pitch axes are used.

As specified hereinbelow, the auxiliary control device 3 comprises a set of piloting laws making it possible to automate the control of one or more piloting axes during the phases where it is potentially necessary to pilot the three axes simultaneously (takeoff and landing). Thus, by taking charge of the piloting of one or more piloting axes, the auxiliary control device 3 allows the pilot of the aircraft to have to control two axes at most, this corresponding to the standard situation and therefore not requiring new piloting skills.

The piloting system 1 therefore makes it possible to use a "three-axis" control stick 2, while guaranteeing that the pilot will not need, in the course of the flight, to have to pilot the three piloting axes simultaneously.

The piloting system 1, such as described hereinabove, exhibits especially the following advantages, on account of doing away with the functionality of the rudder bar (and optionally of the helm), only the brake pedals remaining:
- simplification of the design of the piloting members. A less expensive item of equipment is therefore obtained;
- reduced mass;
- reduced bulkiness; and
- easier maintenance. On large-size aircraft, a part of the rudder bar is generally situated under the floor of the cockpit, whereas with simplified brake pedals, a design solely above the floor is simpler to achieve.

Furthermore, the automatic piloting implemented by the auxiliary control device 3, during those flight phases which are very dynamic and stressful for the pilot, namely takeoff and landing, especially in case of strong disturbances (for example an engine fault, or a strong crosswind), makes it possible to facilitate the manual piloting in the course of these phases, and to decrease the pilot's workload.

The auxiliary control device 3 can be embodied according to several variant embodiments. These variants correspond to various sets of piloting laws making it possible to avoid the pilot's having to pilot the three piloting axes at the same time, doing so only during the takeoff and landing phases, which are the only ones involving simultaneous piloting of the three axes of the aircraft.

Figure 3:
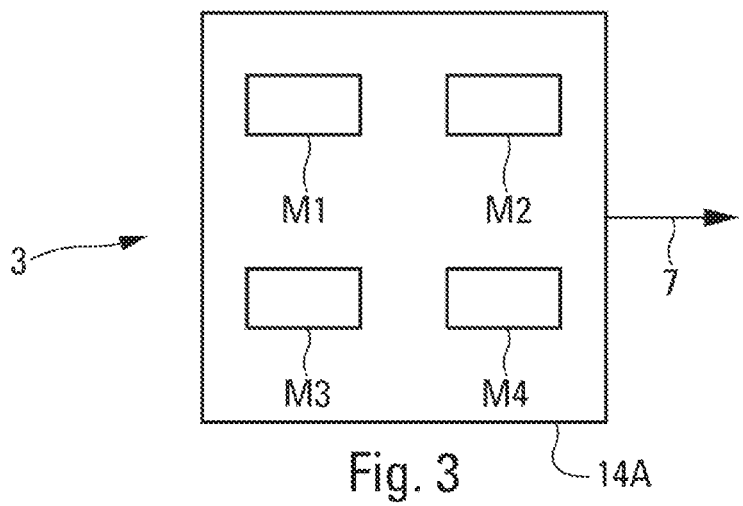
FIGS. 3 to 5 are the schematic diagrams of three different embodiments of an automatic control device of a piloting system.

In a first variant embodiment represented in FIG. 3, the auxiliary control device 3 comprises a set 14A of control modules. The set 14A comprises:
- a module M1 for slaving the yaw rate of the aircraft, which is configured to automatically maintain the yaw rate at zero to within a margin, on the ground, during the takeoff phase;
- a module M2 for automatically maintaining the wings level, on the ground, during the takeoff phase;
- a module M3 for automatic compensation of turning, in flight. This module M3 uses a standard automatic turning compensation law; and
- a module M4 for automatic yaw alignment (or "de-crabbing"), during the landing phase. This module M4 uses a standard "de-crabbing" law.

The module M1 comprises a standard law for slaving the yaw rate of the aircraft, such as described especially in documents FR-2 842 337 (or U.S. Pat. No. 7,139,645) or FR-2 857 468 (or U.S. Pat. No. 7,014,146). The yaw order controls a yaw rate order for the aircraft on the ground. Thus, when the yaw piloting axis of the control stick is in the neutral position, the law slaves the yaw rate of the aircraft to zero. This makes it possible, in case of lateral disturbance of the aircraft (for example, in case of strong crosswind and/or of engine fault on takeoff), to maintain a yaw rate close to zero and therefore to automatically compensate the disturbances. The pilot need therefore make little or no correction with the aid of the yaw control of the control stick 2 to maintain the aircraft on the axis of the runway used during the takeoff run.

Furthermore, the module M2 comprises a standard law for automatically maintaining the wings level, such as described especially in document FR-2 909 463 (or U.S. Pat. No. 7,908,043). This piloting law makes it possible, when the roll control of the control stick is at neutral, to maintain the roll of the aircraft in a reduced roll span (typically +/−2° of roll) during the takeoff run. Thus, in case of strong crosswind generating roll on the ground, the aircraft AC is automatically maintained with its wings level by the auxiliary control device 3.

Thus, by virtue of the modules M1 and M2, the pilot does not need to use the three axes of the control stick 2 simultaneously, since in the course of takeoff, he has only to perform small corrections in yaw and to perform the rotation of the aircraft, that is to say a piloting on two axes only.

Moreover, by virtue of the module M4, the pilot does not have to manage the yaw of the aircraft during landing, and can therefore concentrate on the roll and flare maneuvers on landing, as with a standard control stick.

Figure 4:
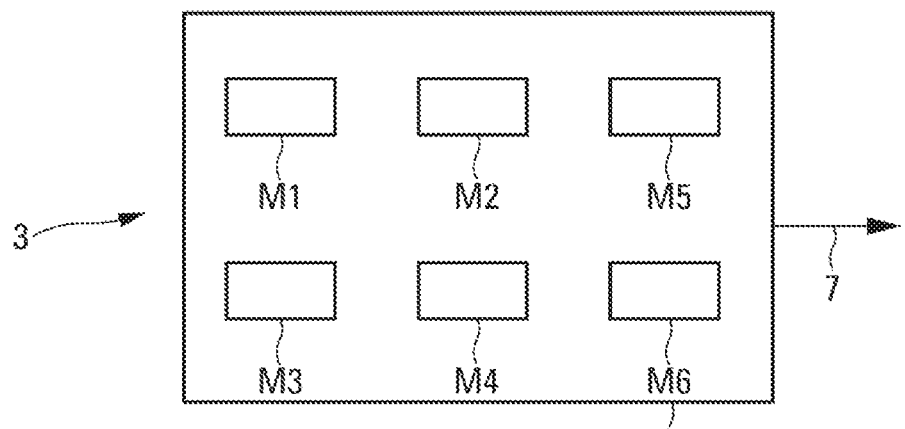

Moreover, in a second variant embodiment represented in FIG. 4, the auxiliary control device comprises a set 14B of control modules. This set 14B comprises, in addition to the modules M1 and M4 of the first variant embodiment:
  a module M5 for slaving the aircraft to a given axis, during the takeoff phase; and
  a module M6 for automatic control of a flare, during the landing phase.

The module M5 makes it possible, on the yaw axis, to slave the aircraft to a virtual axis defined by the pilot or to an axis defined by an item of equipment of the airport of ILS ("Instrument Landing System") type. It uses a standard law which relies on the yaw slaving law used in the module M1. With respect to this yaw slaving law, the law of the module M5 making it possible to maintain the aircraft on an axis, obviates the need for the pilot to slightly correct his trajectory along the runway in case of lateral disturbances.

By virtue of this additional degree of automation (with respect to the first variant embodiment), the pilot need no longer manage either the yaw or the roll, during takeoff, but solely the rotation of the aircraft, thereby facilitating the piloting of the aircraft and further decreasing the pilot's workload during this dynamic phase.

Moreover, associated with the automatic "de-crabbing" law of the module M4, the module M6 uses a standard flare law on landing, which is automatic. By virtue of this law, the pilot need not manage the pitch of the aircraft during landing, and can therefore concentrate on the roll maneuver.

Figure 5:
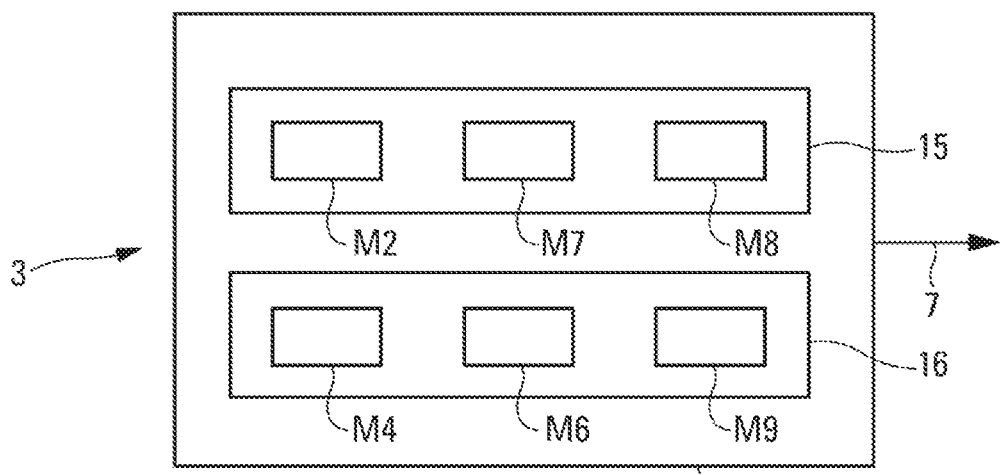

Moreover, in a third variant embodiment represented in FIG. 5, the auxiliary control device 3 comprises a set 14C of control modules. This set 14C comprises:
  an automatic takeoff set 15, comprising for the takeoff phase:
    the module M2 for automatically maintaining the wings level;
    a module M7 for automatically slaving the aircraft to a virtual axis in terms of yaw, using a standard slaving law; and
    an automatic rotation module M8; and
  an automatic landing set 16, comprising for the landing phase:
    the module M4 for automatic "de-crabbing";
    the module M6 for automatic control of the flare; and
    a module M9 for automatically maintaining a lateral axis in flight and on the ground.

The module M8 comprises a standard law of automatic rotation, such as described especially in document FR-2 909 461 (or U.S. Pat. No. 7,835,829), for the pitch. This law makes it possible to automatically perform the rotation of the aircraft at the characteristic speed VR (rotation speed).

Furthermore, the module M9 comprises a standard law of automatic maintaining of lateral axis in flight and on the ground for the roll, with a slaving of the aircraft to a LOC signal of the ILS system.

This third variant embodiment of FIG. 5 generates fully automated takeoff and landing phases, for which the pilot does not need to pilot the aircraft manually. The use of the yaw axis of the "three-axis" control stick is therefore essentially limited to the taxiing phase (replacement of the helm) and during the takeoff rolling and landing rollout phases in the course of which the pilot can use the yaw control of the control stick to carry out exceptional maneuvers that could not be carried out by the auxiliary control device, such as for example the avoidance of an obstacle on the runway.

Figure 6:
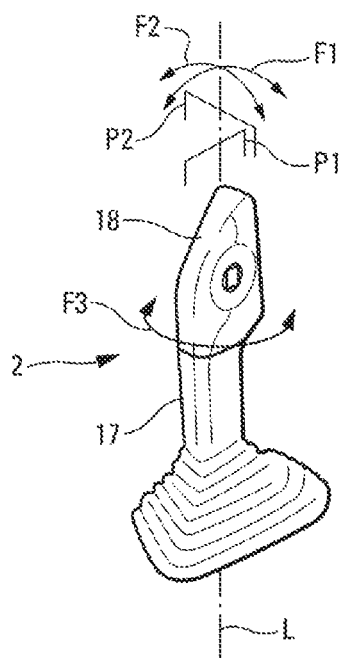
FIG. 6 illustrates, schematically, in perspective, an exemplary control stick, of "three axis" type, embodied in the form of a mini-stick.

Moreover, in a preferred embodiment, represented in FIG. 6, the control stick 2 comprises a lever 17 provided at its free end with a handle 18. This control stick 2 is configured:
  to be able to be pivoted as a whole (lever 17 and handle 18) in a first plane P1, fore and aft as illustrated by a double-arrow F1, to control the aircraft in relation to the pitch axis; and
  to be able to be pivoted as a whole (lever 17 and handle 18) in a second plane P2, to the right and the left as illustrated by a double-arrow F2, to control the aircraft in relation to the roll axis.

This embodiment corresponds to that of a "two-axis" control stick.

Moreover, the handle 18 is configured to be able to be pivoted with respect to the lever 17 as illustrated by a double-arrow F3 about an axis L of the lever 17 to control the aircraft in relation to the yaw axis.

So as to be able to replace in an effective manner at one and the same time the rudder bar (and optionally the helm), the axis controlling the yaw of the aircraft exhibits ergonomic and physical characteristics suitable for the task of lateral control of the aircraft at all rolling speeds, both during the rolling phase or at high speed on the takeoff or landing runway.

In a particular embodiment, the handle 18 comprises a return element (not represented) which is configured to bring the handle 18 back automatically to a neutral position, when it is released after having been previously actuated by a pilot to control the yaw axis (arrow F3). This return element exhibits the characteristics of a restoring torque proportional to angular displacement (with an acceptable order of magnitude of 1 N·m).

The neutral position of the handle 18 is not necessarily the central position with respect to the total amplitude of travel (of the handle 18), illustrated by the double-arrow F3. Indeed, the travels on either side of the neutral position may not be symmetric, especially for physiological reasons in respect of travel of the wrist in terms of bending and extension.

Thus, in a particular embodiment, the handle 18 is configured so that its maximum angular travel to control the aircraft in relation to the yaw axis is larger in one direction than in the other, relative to the neutral position. For reasons of a physiological nature in respect of the pilot's wrist, acceptable maximum angular travels are of the order of 20° in terms of bending and 30° in terms of extension.

Furthermore, the control stick 2 comprises an integrated resistance element (not represented), which is configured to generate a resistance in the handle 18 during its actuation with a view to controlling the yaw axis. This resistance element exhibits a damping (by developing a torque which opposes the displacements of the handle 18 which relate to the arrow F3 about the axis L), so as to reproduce the behavior of the helm, for which the damping is very significant. This makes it possible to limit the phase shift between the angular position of the control stick and the angular position of the nose wheel in the rolling phase. Thus, the "three-axis" control stick with the highly damped yaw axis makes it possible to limit the risks of pilot induced oscillations during the low-speed rolling phase. Provision may be made for an order of magnitude of 0.1 Nms/° for the damping.

The handle 18 may optionally possess a threshold in torque about the neutral position, so that this neutral position is well marked mechanically.

Operation of the piloting system 1, such as described hereinabove, is as follows.

During one of the following phases of the aircraft: a landing phase and a takeoff phase, the auxiliary control device 3 controls the aircraft automatically with respect to at least one of its piloting axes as a function of the modules M1 to M9 that it comprises. Moreover, via the control stick 2, the pilot manually controls the other piloting axes which are not controlled automatically by the auxiliary control device 3 during these landing and takeoff phases.

In the aforementioned third variant embodiment, the auxiliary control device 3 controls the aircraft automatically with respect to the set of its piloting axes during the landing and takeoff phases so that no manual piloting is demanded of the pilot.

Moreover, in the phases other than the landing phase and the takeoff phase, the pilot can pilot the aircraft manually with the aid of the control stick 2, without the auxiliary control device 3 intervening.

In a preferred embodiment, the modules M1 to M9 correspond to software functions which are carried out by a processing unit (for example a processor or a micro-controller) part of the auxiliary control device 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for piloting an aircraft, said piloting system comprising:
   at least one control stick configured to be actuated by a pilot so as to control the aircraft with respect to three piloting axes, namely the pitch axis, the roll axis and the yaw axis, and
   an auxiliary control device configured to automatically control the aircraft during one of the following phases: a landing phase and a takeoff phase, the auxiliary control device configured to automatically control the aircraft with respect to at least one of said piloting axes while the control stick is simultaneously configured to manually control the other piloting axes which are not controlled automatically by said auxiliary control device.

2. The system as claimed in claim 1, wherein said auxiliary control device comprises at least one control module configured to automatically determine, with the aid of at least one integrated control law, a control order which is applied to control surfaces of the aircraft to control the aircraft with respect to at least one corresponding piloting axis.

3. The system as claimed in claim 2, wherein said auxiliary control device comprises, as control modules:
   a module configured to slave the yaw rate of the aircraft, which is configured to automatically maintain the yaw rate at zero to within a margin, on the ground, during the takeoff phase;
   a module configured to automatically maintain the wings level, on the ground, during the takeoff phase;
   a module configured to automatically compensate turning, in flight; and
   a module configured to automatically align the yaw, during the landing phase.

4. The system as claimed in claim 3, wherein said auxiliary control device further comprises:
   a module configured to slave the aircraft on a given axis in yaw, during the takeoff phase; and
   a module configured to automatically control a flare, during the landing phase.

5. The system as claimed in claim 4, wherein said auxiliary control device comprises:
   an automatic takeoff set comprising for the takeoff phase:
   a module configured to automatically slave the aircraft to a virtual axis in terms of yaw;
   the module configured to automatically maintain the wings level; and
   an automatic rotation module; and
   an automatic landing set comprising for the landing phase:
   the module configured to automatically align yaw;
   the module configured to automatically control flare; and
   a module configured to automatically maintain a lateral axis in flight and on the ground with respect to roll.

6. The system as claimed in claim 1, wherein the control stick comprises a lever provided with a handle, and the control stick is configured:
   to pivot as a whole in a first plane, to control the aircraft in relation to the pitch axis; and
   to pivot as a whole in a second plane different from said first plane, to control the aircraft in relation to the roll axis, and
   to pivot with respect to the lever to control the aircraft in relation to the yaw axis.

7. The system as claimed in claim 6, wherein the handle is configured to return automatically to a neutral position, when it is released after having been previously actuated to control the yaw axis.

8. The system as claimed in claim 6, wherein the control stick comprises a resistance element configured to generate a resistance in the handle during its actuation with a view to controlling the yaw axis.

9. The system as claimed in claim 6, wherein the maximum angular travel of the handle to control the aircraft in relation to the yaw axis is larger in one direction than in the other, relative to a neutral position.

10. A method for piloting an aircraft, said aircraft comprising at least one control stick configured to be actuated by a pilot so as to control the aircraft with respect to its piloting axes, said control stick being configured to control the aircraft with respect to its three piloting axes, namely the pitch axis, the roll axis and the yaw axis, and said method comprising:

simultaneously automatically controlling the aircraft, during an automatic piloting step, with respect to at least one of said three piloting axes, during one of the following phases of the aircraft: a landing phase and a takeoff phase; and simultaneously manually controlling the aircraft by a pilot, during a manual piloting step, the other of said three piloting axes with the aid of the control stick, during the one of the landing and takeoff phases.

11. The method as claimed in claim 10, wherein the automatic piloting step comprises automatically controlling the aircraft with respect to the set of its piloting axes during the landing and takeoff phases.

12. An aircraft comprising a piloting system for piloting an aircraft, said piloting system comprising:

at least one control stick configured to be actuated by a pilot so as to control the aircraft with respect to at least some of three piloting axes, namely the pitch axis, the roll axis and the yaw axis, and an auxiliary control device configured to automatically control the aircraft during one of the following phases: a landing phase and a takeoff phase, the auxiliary control device configured to automatically control the aircraft with respect to at least one of said piloting axes while simultaneously the control stick is configured to manually control the other piloting axes which are not controlled automatically by said auxiliary control device.

\* \* \* \* \*